(12) United States Patent
Edwards et al.

(10) Patent No.: US 9,341,732 B2
(45) Date of Patent: May 17, 2016

(54) CONTINUOUSLY TOWED SEAFLOOR ELECTROMAGNETIC PROSPECTING SYSTEM

(75) Inventors: Nigel Edwards, Ontario (CA); Eleanor Willoughby, Ontario (CA); Reza Mir, Ontario (CA); Carsten Scholl, Berlin (DE)

(73) Assignee: The Governing Council of the University of Toronto, Toronto (CA)

( * ) Notice: Subject to any disclaimer, the term of this patent is extended or adjusted under 35 U.S.C. 154(b) by 279 days.

(21) Appl. No.: 13/139,936

(22) PCT Filed: Dec. 14, 2009

(86) PCT No.: PCT/CA2009/001830
§ 371 (c)(1),
(2), (4) Date: Sep. 8, 2011

(87) PCT Pub. No.: WO2010/069055
PCT Pub. Date: Jun. 24, 2010

(65) Prior Publication Data
US 2012/0134671 A1 May 31, 2012

Related U.S. Application Data

(60) Provisional application No. 61/122,489, filed on Dec. 15, 2008.

(51) Int. Cl.
*H04B 13/02* (2006.01)
*G01V 3/12* (2006.01)
*G01V 3/08* (2006.01)

(52) U.S. Cl.
CPC . *G01V 3/12* (2013.01); *G01V 3/083* (2013.01)

(58) Field of Classification Search
None
See application file for complete search history.

(56) References Cited

U.S. PATENT DOCUMENTS 4,649,530 A * 3/1987 Porter, Jr. ............... 367/154
4,873,601 A * 10/1989 Wakasa ............... B66B 1/28
307/43

(Continued)

FOREIGN PATENT DOCUMENTS

WO     WO 0214906 A1 * 2/2002
WO     WO 2006059122 A1 * 6/2006

OTHER PUBLICATIONS

International Search Report dated Mar. 29, 2010 for PCT/CA2009/001830 (2 pages).
Written Opinion of the International Searching Authority dated Mar. 29, 2010 for PCT/CA2009/001830 (6 pages).
International Preliminary Report on Patentability dated Jun. 21, 2011 for PCT/CA2009/001830 (2 pages).

(Continued)

*Primary Examiner* — Ken Vanderpuye
*Assistant Examiner* — David Lambert
(74) *Attorney, Agent, or Firm* — Taylor IP, P.C.

(57) ABSTRACT

A towed system for underwater electromagnetic prospecting for use with a seaward vessel is provided. The towed system comprises a first portion, a second portion, and a tow cable. The first portion is located on the vessel and includes a controller and a power supply system. The second towed portion is for submersion in the water and transmits an electromagnetic waveform and receives a corresponding electromagnetic signal. The tow cable connects the first portion with the second portion. The tow cable includes at least a pair of suitable conductors for delivering to the second portion a power signal generated by the first portion and at least one optical fiber for carrying data communications between the first portion and the second portion. The transmitted and received signals are digitized and this information is sent digitally to the controller in the first portion.

22 Claims, 9 Drawing Sheets

(56) References Cited

U.S. PATENT DOCUMENTS

| | | | |
|---|---|---|---|
| 5,859,812 A * | 1/1999 | Sullivan et al. | 367/130 |
| 6,600,995 B2 * | 7/2003 | Strickland et al. | 702/7 |
| 2008/0122444 A1 | 5/2008 | Schaug-Pettersen et al. | |
| 2008/0267009 A1 * | 10/2008 | Frivik et al. | 367/15 |
| 2008/0284441 A1 * | 11/2008 | Kowalczyk et al. | 324/334 |
| 2009/0133870 A1 * | 5/2009 | Pavlov | G01V 3/12 166/250.16 |

OTHER PUBLICATIONS

Duncan, P.M., Hwang, A., Edwards, R.N., Bailey, R.C. and Garland, G.D., The Development and Applications of a Wide Band Electromagnetic Sounding System Using a Pseudo-Noise Source, Geophysics, vol. 45, pp. 1276-1296, 1980 (21 pages).

Canadian Examiner's Requisition dated Feb. 15, 2016 for Canadian Application No. 2,746,889 (5 pages).

* cited by examiner

CONTINUOUSLY TOWED SEAFLOOR ELECTROMAGNETIC PROSPECTING SYSTEM

CROSS REFERENCE TO RELATED APPLICATIONS

The present application claims priority to U.S. Provisional Application No. 61/122,489, filed Dec. 15, 2008, the entirety of which is hereby incorporated by reference.

TECHNICAL FIELD

The present disclosure relates generally to underwater exploration, and more particularly to a system for a continuously towed seafloor electromagnetic prospecting system.

BACKGROUND

Conventional seafloor electromagnetic prospecting systems have been devised and have been used both by academics and commercial organizations for underwater exploration. One common system consists of a transmitter electric dipole towed behind a ship near an array of receiver electric field dipoles, which are dropped individually to the seafloor and subsequently recovered.

This conventional system is limited in a number of ways. Data is available only after recovery of the receivers. Knowledge of the orientations of the receiver antennas is limited by accuracy of compass data and relies on the antenna arms falling in an orthogonal cross-like pattern, which is difficult to precisely control. Further, the estimates of the time of travel of an electromagnetic signal or equivalently the phase of a single transmitted frequency are limited by the stability of clocks. Each instrument has to have its own clock, which although synchronized against a master clock at deployment, is prone to drifting as the survey proceeds through the day introducing error. Further, the distance between the transmitter and a receiver has to be obtained by active acoustical systems with limited resolution so that the distance between the transmitter and a receiver is also determined erroneously. Receiver deployment and recovery is a time consuming process and some receivers are lost due to release failures.

It would be desirable to have a system for seafloor electromagnetic prospecting that addresses at least some of the shortcomings of the conventional systems.

SUMMARY

One aspect of the present disclosure provides a towed system for underwater electromagnetic prospecting for use with a seaward vessel. The towed system comprises a first portion located on the vessel, the first portion including a controller and a power supply system; a second towed portion for submersion in the water, the second towed portion for transmitting an electromagnetic signal and receiving a corresponding electromagnetic signal; and a tow cable connecting the first portion with the second portion. The tow cable includes at least one pair of suitable conductors for delivering to the second portion power generated by the first portion and at least one optical fibre for carrying data communications between the first portion and the second portion.

Another aspect of the present disclosure provides a towed system for electromagnetic prospecting for use with a towing vessel. The towed system comprises a first portion located on the vessel, the first portion including a controller and a power supply system; a second towed portion for towing across land, the second towed portion for transmitting an electromagnetic signal and receiving a corresponding electromagnetic signal; and a tow cable connecting the first portion with the second portion. The tow cable includes at least one pair of suitable conductors for delivering to the second portion power generated by the first portion and at least one optical fibre for carrying data communications between the first portion and the second portion.

BRIEF DESCRIPTION OF THE DRAWINGS

Reference will now be made to the drawings, which show by way of example, embodiments of the present disclosure, and in which.

It will be noted that throughout the appended drawings, like features are identified by like reference numerals.

DETAILED DESCRIPTION

Hydrocarbon deposits in the form of petroleum, natural gas and natural gas hydrate occur offshore worldwide. These deposits have the physical property of being more electrically resistive than most of the host rock in which the deposits occur. Electromagnetic systems may be used to map and assess these economic targets. A system may be devised to analytically or numerically model a response of the target, conduct field tests at sea, and analyze and interpret the data producing an image of the sub-seafloor. Previous publications have addressed some of these issues, such as: Duncan, P. M., Hwang, A., Edwards, R. N., Bailey, R. C. and Garland, G. D., The development and applications of a wide band electromagnetic sounding system using a pseudo-noise source, Geophysics, Vol. 45, pp. 1276-1296, 1980.

A towed seafloor electromagnetic prospecting system comprises a transmitter (TX) of an electromagnetic disturbance and one or more receivers (RX) which sense the disturbance at some distance L from the transmitter at a time T related to L as:

$$T=C\mu_o L^2/\rho$$

where $\rho$ is the resistivity of the surrounding medium, $\mu_o$ is the electromagnetic permeability, and C is a system dependent constant. It is possible to obtain a value for the resistivity $\rho$ from this formula if C, L and T are known. While the formula holds well for a uniform medium, a more complicated electrical structure may need detailed numerical modeling. However, the presence of an anomalous resistive target between the transmitter and a receiver results in a shortened travel time. Several practical electromagnetic systems have been devised and have been used both by academics and commercial organizations for exploration. One common system consists of an electric dipole transmitter towed behind a ship near an array of electric field dipole receivers which are dropped individually to the seafloor and subsequently recovered.

Figure 1:
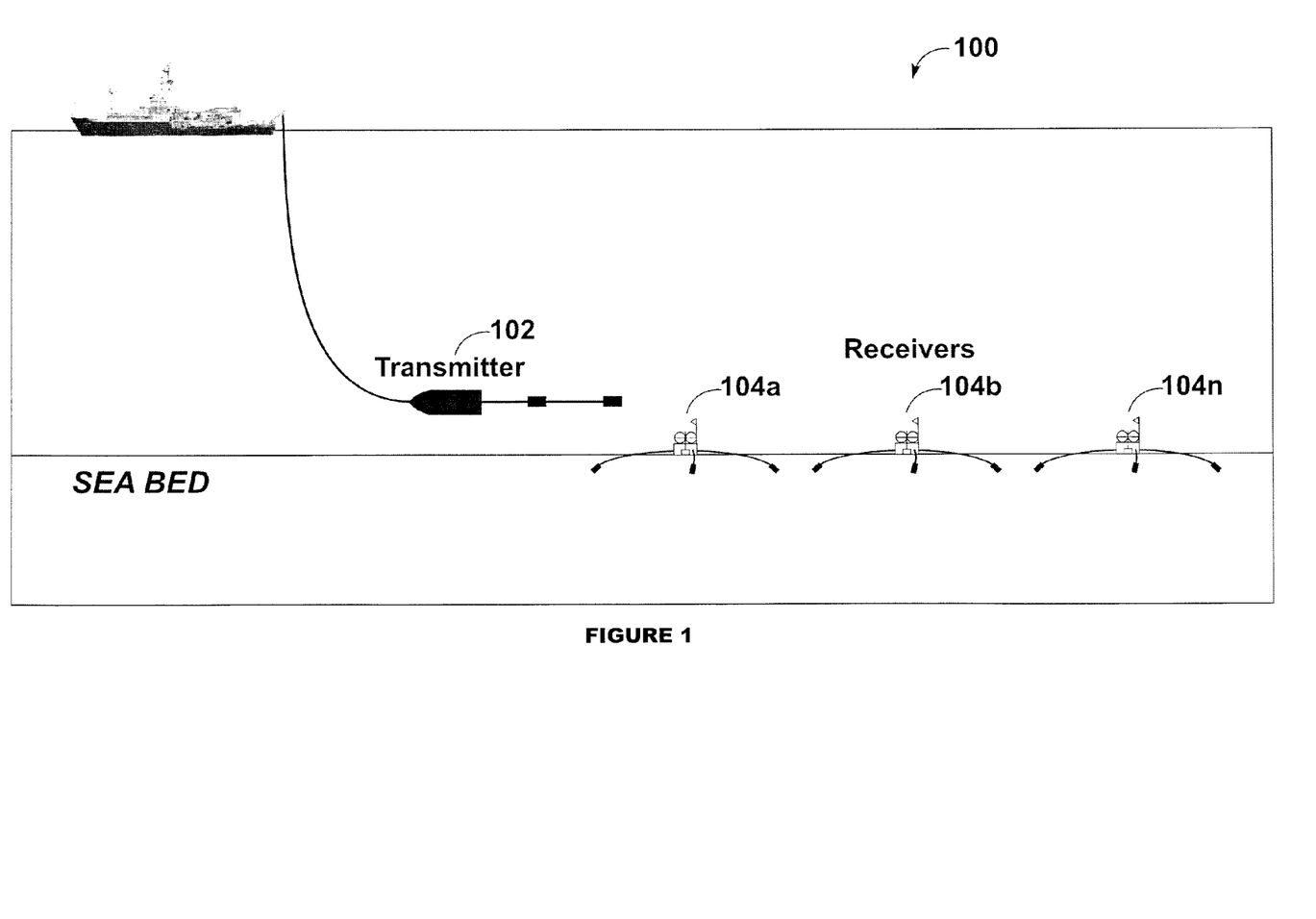
FIG. 1 shows in diagram form an illustration of a conventional electromagnetic prospecting system.

Referring to FIG. 1, the diagram illustrates a conventional electromagnetic prospecting system 100. The system 100 includes an electric dipole transmitter 102 and a number of electric field dipole receivers 104, individually indicated as 104a, 104b, . . . , 104n. The system 100 is limited in a number of ways. Receiver data is available only after recovery of the receivers 104 from the bottom of the sea. Further, the estimates of the time of travel T of an electromagnetic signal or the phase of a single transmitted frequency are limited by the stability of clocks. Each instrument, such as the transmitter 102 and receivers 104, have their own clocks, which although synchronized at deployment, are prone to drifting as the survey proceeds through the day introducing an error in T. The orientation of the receiver 104 antennas, required for data interpretation, is deduced by attempting to find magnetic north with an onboard compass and relies on the measurement arms falling in an orthogonal cross-like pattern. Further, the distance between the transmitter 102 and any one of the receivers 104 is obtained by active acoustical systems with limited resolution so that L is also determined with some error component. Deployment and recovery of the receivers 104 is a time consuming process and some of the receivers 104 are often lost due to release failures.

Figure 2:
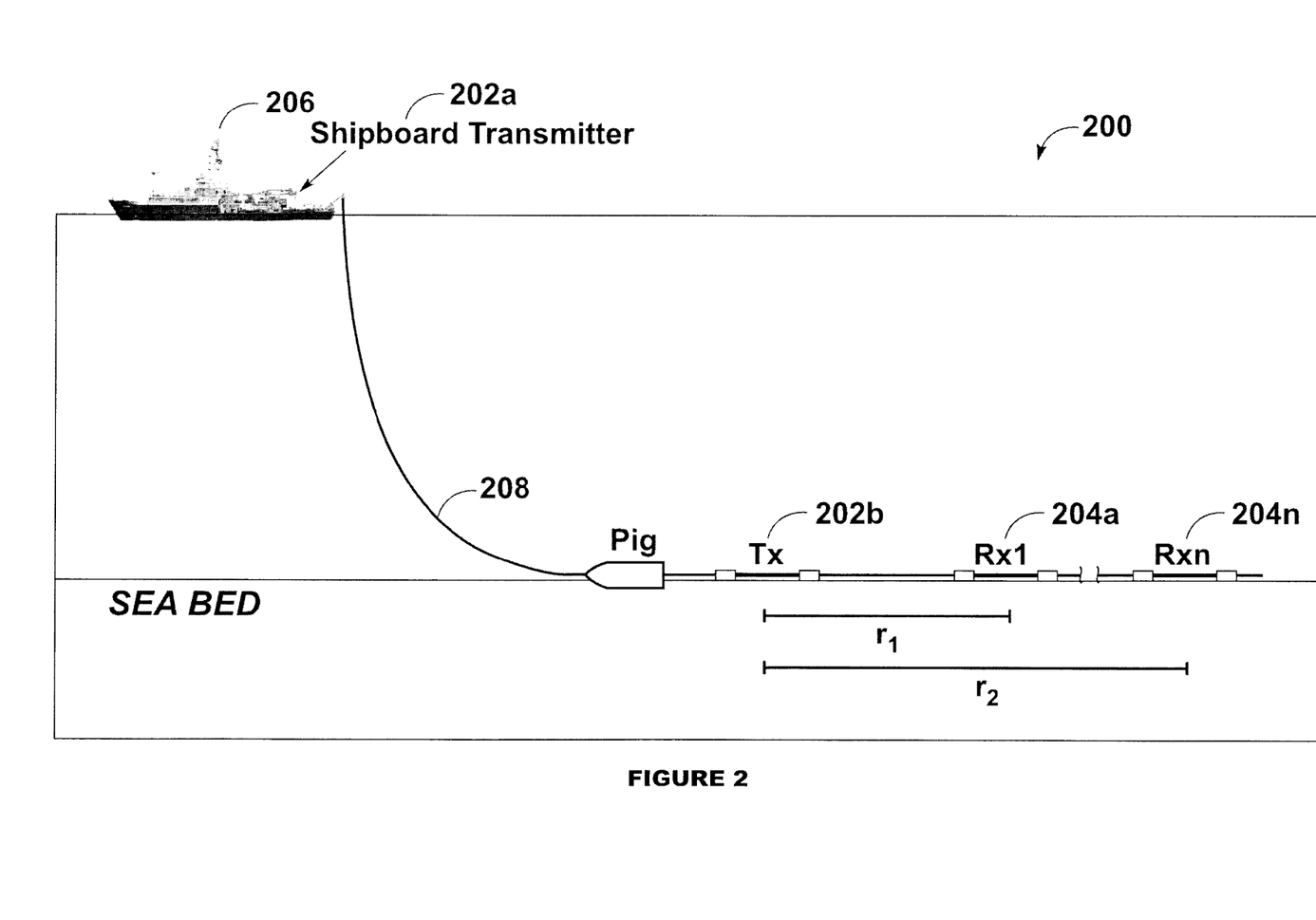
FIG. 2 shows in diagram form a towed inline seafloor system in accordance with one embodiment.

Referring to FIG. 2, a diagram is shown illustrating a towed inline seafloor system 200 in accordance with one embodiment. One embodiment that aims to overcome some of the limitations of the system of FIG. 1 is shown in FIG. 2. One or more self-contained receivers 204 are linked in a linear array and are individually indicated by 204a, . . . , 204n, with the array referenced as 204a-n. The receivers 204 are capable of measuring small variations in the electric field generated by a remote transmitter 202b. The transmitter electronics 202a may be located on a ship 206. The receivers 204, remote transmitter 202b, and transmitter electronics 202a may be all connected via a conducting wire or towing cable 208. The transmitter 202b and transmitter electronics 202a may collectively be referred to as the transmitter 202.

The array 204a-n may be towed along in contact with or in close proximity to a relatively flat, sedimented seafloor. The transmitter 202b dipole may be energized by a fairly high commutated current (e.g., with amplitude of 50 Amps or more). The energizing current transmitted to the transmitter dipole 202b by the transmitter electronics 202a may be practically limited by the gauge of the conducting wire (e.g., the resistance of the towing cable 208). Each receiver 204 may include an electronic package that may be contained inside a pressure-safe case. In one example, the receivers 204 may be housed in pressure-safe cylinders and may have an outer diameter of 3.20+/−0.002 inches and an inner diameter of 2.989+/−0.002 inches. The receivers 204 may include electrodes located in a rubber hose. In one example, the electrodes may be silver-silver chloride electrodes and the receivers 204 may amplify the induced potential difference between the electrodes and use an analog-to-digital converter and digital circuitry to process, stack and/or store the data. While specific examples for the pressure-safe case and silver-silver chloride electrodes used in the receivers 204 are provided, the thickness of the walls may be any suitable thickness designed to withstand the water pressure at the depths that the receivers 204 are to be used and any suitable design and/or material for the electrodes may be used.

Synchronization between the transmitter 202 and the receivers 204 may be achieved by using precision clocks at the transmitter 202 and each receiver 204. Synchronization against a master clock may be completed at the beginning of the survey. The towed system 200 may have a number of advantages over the conventional system 100, shown in FIG. 1. The geometry of the transmitter 202b and receivers 204 dipoles may be accurately known and may be invariant over the survey. The deployment and recovery of the system 200 may be rapid and relatively straightforward, compared to that of the system 100. Using the system 200, typically no receivers 204 should be lost due to failure of releases.

However, the system 200 has some areas of potential improvement that may include: (a) since the clocks are synchronized at each of the receivers 204 with the transmitter 202 clock at deployment, clock drift may still be further reduced; (b) data is typically collected at the seafloor and may be downloaded at the end of the survey; (c) the power available at the seafloor may be limited by the transmitter electronics 202a design and the gauge of copper in the tow cable 208, which may be further improved; and/or (d) the amplifiers in the receivers 204 may have limited dynamic range and low cut analog filters may be used to acquire data in the presence of noise (e.g., streaming potentials), which may be further improved. With the system 200, data collection is typically performed when the array 204a-n is stopped periodically by a process of paying out tow cable from a winch at an observation site and then recovering the cable before the ship 206 arrives at the next site, a process that may be improved with further refinement. Further, it may be challenging to achieve the late time direct current limit of the commutated signal at the receivers and this may limit the style of interpretation of the data. Further improvements that address these issues are discussed below in connection with FIG. 3.

Figure 3:
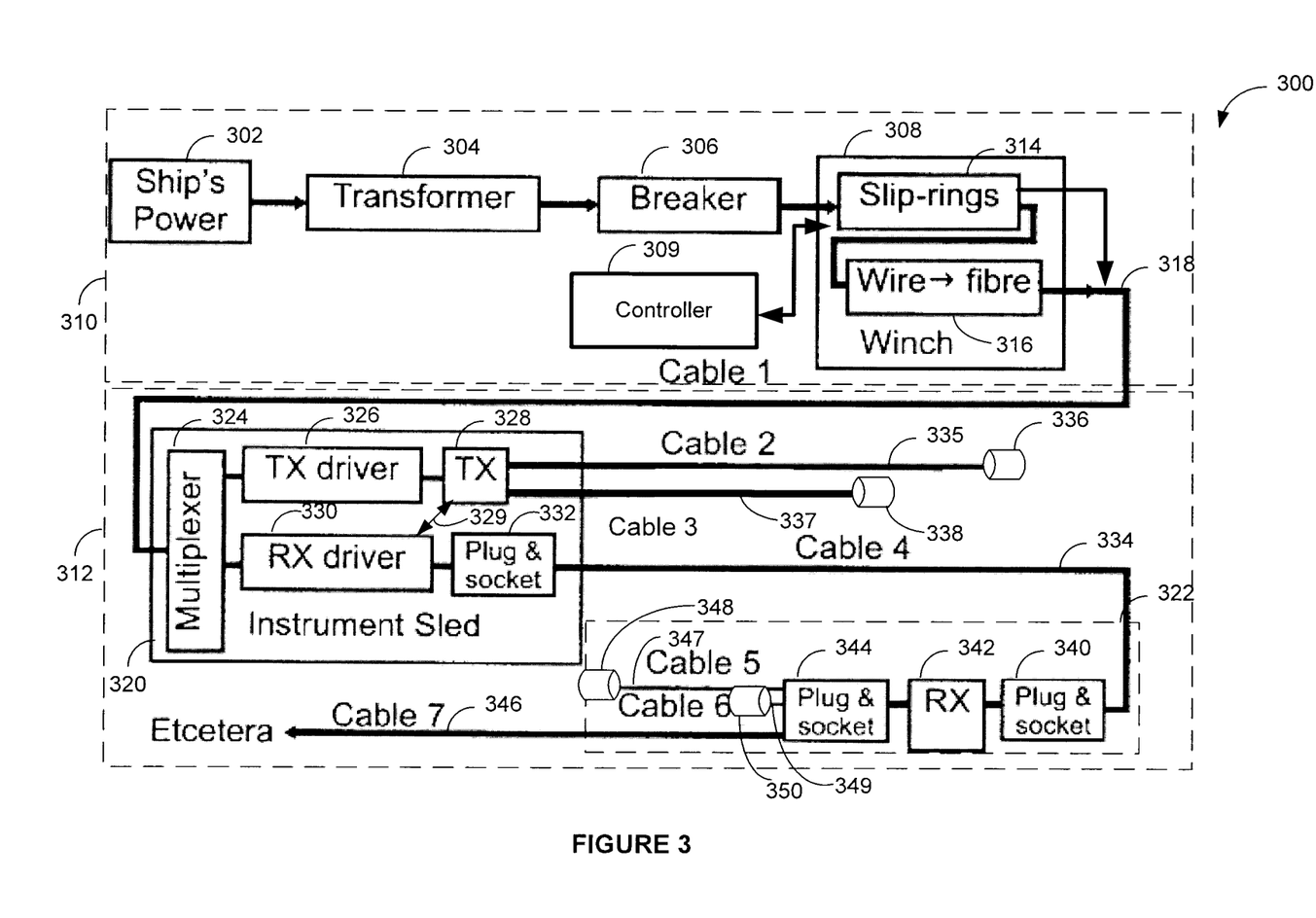
FIG. 3 shows in block diagram form a continuously towed seafloor electromagnetic prospecting system in accordance with one embodiment.

Referring to FIG. 3, a block diagram is shown illustrating a continuously towed seafloor electromagnetic prospecting system 300 in accordance with one embodiment. The system 300 may be a towed system for underwater electromagnetic prospecting for use with a seaward vessel, such as the ship 206. The system 300 generally comprises a first portion 310 that may be located on the vessel, such as the ship 206 (FIG. 2) and a second portion 312 for submersion in the water that may be deployed into the water during use. The second portion 312 may transmit an electromagnetic signal and receive the corresponding electromagnetic signal after it has propagated through the surrounding water and/or bedrock. While the sea is used as an exemplary application of the system 300, the system 300 may be used in any aquatic environment such as a lake or ocean. Additionally, suitable variations of the system 300 may even be used on land, where the seaward vessel is replaced with a vessel that travels on land, such as a tractor or other towing device. The second portion may also be adapted for use on land. While the ensuing example describes an underwater system towed by a seaward vessel as an example, the subject matter of the present application is equally suitable for use on land (with appropriate adaptations) and is in no way intended to be limited to underwater applications.

The first portion 310 generally includes a power supply 302, a transformer 304, a breaker 306, a winch assembly 308, and a controller 309. In one example, the controller 309 may be a general purpose computer. In one example, the power supply 302 may be a 20 kilowatt power supply generating between 380 and 600 VAC, 3 phase. The generated power may be passed through the transformer 304, which in one example may be an isolating transformer that reduces the voltage to 380V. The transformer 304 may be followed by the breaker box 306, which may include a current surge limiter. The generated power may next flow through the winch assembly 308. In one example, the winch assembly 308 may include slip rings 314 and a converter 316, such as a wire/fibre converter for converting electrical signals generated by the controller 309 or destined for the controller 309 into optical signals for transmission through fibre optic cable contained in a main tow cable 318. The winch 308 may be coupled to the main tow cable 318. In one example, the main tow cable 318 includes conventional wire, such as copper wire for power transmission and at least one fibre optic cable for data communications.

The controller 309 may be a communication data recovery computer and may also be coupled to the main tow cable 318. In one example, communications between the controller 309 and the winch 308 may be by copper wire, twisted pair, which may be converted (e.g., by the converter 316) after the slip rings 314 to an optical signal for transmission by a fibre optic cable to the seafloor. This arrangement of using copper wire for power transmission and optical fibre for communications may reduce, limit, and/or eliminate crosstalk between the communications and power channels. In one example, the main tow cable 318 may have a polypropylene cover spun around six fibres, three shielded twisted communication pairs (e.g., not used in the present example) and three power cables, for example 8 AWG. In one example, the main tow cable 318 may include at least two fibre optic cables contained therein for carrying optical communications and/or data signals between the first portion 310 and the second portion 312. In one example, the main tow cable 318 may be several kilometers long, or even longer.

The second portion 312 generally comprises an instrument sled 320 and one or more receiver assemblies 322. The main tow cable 318 may be attached at an upper end to the winch 308 and at a lower end to the sled 320; the attachments may include one or more stress release devices. The instrument sled 320 contain the components responsible for transmitting the electromagnetic signal. The instrument sled 320 generally comprises a multiplexer 324, a transmitter driver 326, a transmitter main unit 328, a receiver driver 330, and a receiver plug and socket 332. The instrument sled 320 may contain components enclosed in a suitable pressure vessel or vessels designed to withstand the water pressure at the depths at which the sled 320 is expected to be towed, depending on the design criteria of a particular application. In one example, the transmitter 328, transmitter driver 326, and multiplexer 324 may be contained in a first pressure vessel and the receiver driver 330 may be contained in a second pressure vessel.

The transmitter main unit 328 and/or the transmitter driver 326 may have connections to the power supply transmitted through the main tow cable 318. Similarly, communications optical fibres contained in the main tow cable 318 may be coupled to the transmitter driver 326 and/or the transmitter main unit 328. The transmitter driver 326 and receiver driver 330 may communicate independently (e.g., either using separate optical fibres or separate signals multiplexed onto a single fibre) with the ship 206 on the surface of the water via the optical fibres contained in the main tow cable 318. The transmitter driver 326 may include programmable logic and the transmitter 328 may also include programmable logic configured to receive the input power supplied to it by the transmitter driver 326 and produce: a) an output transmitter waveform; and b) a voltage to power the receiver array including each of the receiver assemblies 322. In one example, the transmitter driver 326 may be implemented as a computer and may be primarily concerned with controlling the transmitter 328 and/or communicating between the transmitter 328 and the controller 309. The transmitter 328 may generate signals for transmission based on instructions provided by the transmitter driver 326.

Operation of the transmitter driver 326 and the receiver driver 330 may be controlled from the ship 206 (e.g., using an Ethernet protocol or any other suitable protocol). The receiver driver 330 may derive power from the transmitter 328 through cable 329. The cable 329 may also carry to the receiver driver 330 a representation of the transmitted current transmitted by the transmitter 328. In one example, this representation may include the analog form of the transmitted current.

The transmitter 328 may additionally have electrodes 336 and 338, connected by cables 335 and 337, respectively. In one example, the transmitter electrodes 336 and 338 may be approximately two meters in length and may be made of stainless steel of sufficient dimensions to connect up to 100 A or more of current with the seawater. However, the exact size and material of the electrodes 336 and 338 may be of any suitable size and material to meet the design criteria of a particular application and it may be desirable to connect more than 100 A with the seawater.

In operation, waveform data (e.g., represented as data such as a list of numbers which, when plotted, represents the waveform to be transmitted) may be generated by the controller 309. This waveform data may be sent to the transmitter driver 326, for example over an optical fibre contained in the main tow cable 318. Power electronics contained in the transmitter 328 may generate the actual current waveform for transmission based on waveform data and power supply provided by the transmitter driver 326. The current waveform for transmission may by output to the electrodes 336 and 338 for transmission. The first portion 310 may also include a common system clock (e.g., in the controller 309) with time information being provided, for example in real-time either continuously or at suitable intervals, to any of the instrument sled 320 and/or the receiver assemblies 322, for example over the optical fibres contained in the main tow cable 318, the main cable 334, and/or any subsequent main cables 346. Such a common system clock may greatly improvement or even eliminate problems associated with clock drift discussed above.

Relatively little power may be needed to power the string of receiver assemblies 322. The transmitter 328 may receive the input 3-phase power supplied by the main tow cable 318 through the transmitter driver 326 and may generate both the output waveform to be transmitted and the voltage to power the receivers 322, which is sent to the receiver driver 330 over the cable 329 and is then transmitted down the string of receiver assemblies 322 via main cable 334, etc.

Signals received by the receiver assemblies 322 may be measured simultaneously at each receiver 342, digitized, and sent to the receiver driver 330, for example over an optical fibre contained in the main cable 334, where the received signals are stored synchronously with the digital form of the transmitter 328 current. The controller 309 may receive voltage signals from the receivers 342 through the receiver driver 330 and the corresponding transmitter 328 current signals over the fibre optic link contained in the main tow cable 318 and the controller 309 may further monitor these received signals. In one example, the monitoring performed by the controller 309 may be performed in real time, displaying voltage signals and current waveforms simultaneously. In another example, any of these signals may be received by the controller 309 and stored and/or queued for processing at a later time.

The receiver assemblies 322 may be configured in an array and may be modular in form. The receiver assemblies 322 may be mechanically cascaded (e.g., linked serially) and assembled in sections, possibly each of a different length, to build up, for example, a logarithmically spaced array. Each section of the array may have a main cable 334 connecting the section to the previous section (or to the sled 320, in the case of the first section in the array). Each of the cables such as the main cable 334 may include optical fibres for carrying communications or data signals, twisted pair communication elements, and a power source supplied by the receiver driver 330.

The receiver electronics included in the receiver assembly 322 may be contained in a pressure vessel, which may be designed to be as small and light as possible. The receiver assembly 322 generally includes a first plug and socket 340, the receiver 342 including receiver circuitry, and a second plug and socket 344. The first plug and socket 340 may couple the receiver assembly 322 to the cable 334. The second plug and socket may couple the receiver assembly 322 to a subsequent main cable 346, which leads to the next receiver assembly in the array.

The receiver assembly 322 may further have electrodes 348 and 350 coupled to the receiver assembly 322 by cables 347 and 349, respectively. In one example, the electrode 348 may be approximately 2 meters in length and the electrode 350 may be approximately twelve meters in length. In one example, the electrodes 348 and 350 may be formed of delicate silver-silver chloride devices protected by covers from incidental damage. However, the exact size and material of the electrodes 348 and 350 may be of any suitable size and material to meet the design criteria of a particular application.

In practice, the system 300 is assembled on the deck of the ship 206 by plugging together the desired number of individual receiver sections 322 with main cables such as the cables 334 and 346 to form a streamer up to several kilometers in length. The streamer of receiver assembly sections 322 may be deployed over the stern of the ship 206, followed by the sled 320, and finally the main tow cable 318. The array may be held close to the seafloor by the heavy sled 320 and towed in direct contact with or close proximity to the seafloor.

The system 300 described in connection with FIG. 3 may have a number of advantages. The system 300 may provide for real-time collection of data because of the fibre-optic communications and/or data link between the ship 206 and the sled 320 and the receiver assemblies 322. The received data may be interpreted to a simple model of the seafloor. The system 300 may have two possible modes of operation, including: (a) collecting data by stopping the array periodically by a process of paying out the tow cable 318 from the winch at an observation site and then reeling in part of the cable 318 before the ship arrives at a subsequent site, a process which may be performed because it eliminates the need to remove streaming noise from the received signals because data is only collected when the receiver array is stationary, or (b) collecting data continuously during motion. In one example, an amplifier of the receiver 342 has a 24 bit dynamic range that provides for the ability to continuously collect data. The high 24 bit dynamic range means that small signals can be recorded in the presence of streaming potential noise linearly. The 24-bit receiver amplifier dynamic range makes it possible to record received signals plus received noise and still resolve both the noise and the signal. Performing this resolving function may be difficult with a dynamic range of less than 24 bits because the signal of interest may be off-scale (e.g., below the least significant bit).

The received signal may then be recovered or resolved from the received noise by a simple stacking process. By stacking many received waveforms (e.g., adding the wave forms), random noise, for example due to movement of the receiver assemblies 322 during data collection, may be reduced and/or eliminated since random errors tend to cancel.

In one example, the receiver 342 amplifier may contain no analog filters except to overcome aliasing, at a rate which depends on the sampling rate and the character of the analog-to-digital converter. In one example, a sigma-delta $\Sigma\Delta$ converter may be used with a rate of 1 kHz, so the DC limit is recorded correctly, therefore improving interpretation using conventional resistivity methods. While 1 kHz is used as an example, any suitable high frequency may be used beyond the waveband of interest so long as the high frequency is selected to avoid aliasing data. In another example, the voltage induced in the receiver electrodes 348, 350 may be sampled in the receiver 342 (for each of the cascaded receiver assemblies 322). The sampled data may be sent via cable 334 (and subsequent cables 346 for subsequent receiver assemblies 322) to the receiver driver 330. The current applied to the transmitter electrodes 336, 338 and the voltages sensed by each receiver 342, respectively, may be recorded simultaneously in the receiver driver 330 so that timing uncertainties are substantially reduced and/or eliminated.

In one example, the transmitter 328 and/or transmitter driver 326 may form a class D analog amplifier, which may make the transmitter capable of transmitting any waveform including arbitrary waveforms, such as sinusoids, square waves, a digital pseudo random binary sequence (PRBS), etc. In one example, both the transmitter 328 and array of receiver assemblies 322 are fully controllable from the surface. The transmitter driver 326 may understand and respond to simple controls or commands sent from the controller 309 including ON, OFF, SET and READ CURRENT, etc and new waveforms to be transmitted by the transmitter 328 may be downloaded as a digital sequence sent to the transmitter driver 326 from the controller 309 at any time during a survey.

In one example, if there are no electronic failures, the system 300 may be deployed for many days at a time. The transmitter electrodes 336, 338 may be designed with water tight connectors that prevent exposure of the ends of cables 335, 337 to seawater obviating corrosion. Further the design of the receiver electrodes 348, 350 may minimize streaming potentials by reducing flow of water across the contact area with the fluid environment.

Referring now to FIGS. 4-11, a series of plots of real data are shown that were experimentally obtained on a survey employing the system 300 shown in FIG. 3.

Figure 4A:
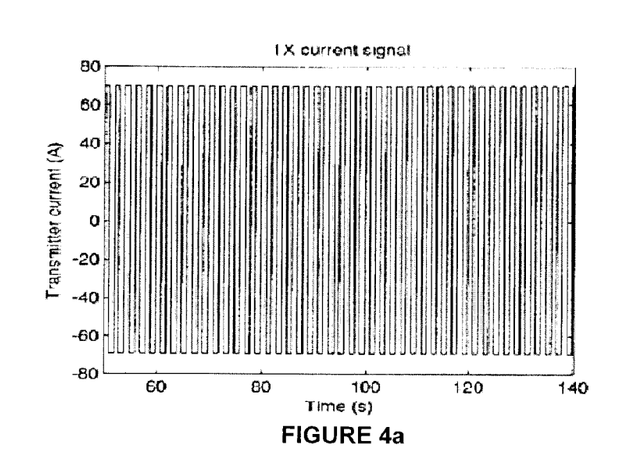
FIGS. 4a and 4b show in graph form raw transmitter current signal and raw receiver electric field data, respectively, according to one experimental result in accordance with one embodiment.
Figure 4B:
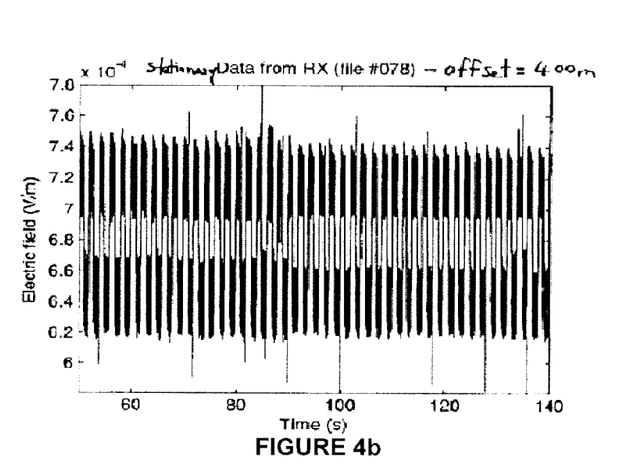

Referring to FIGS. 4a and 4b, FIG. 4a shows in graph form a raw record (e.g., no processing performed on the data) of the transmitter current signal applied between, for example, the transmitter electrodes 336, 338. FIG. 4b shows in graph form the corresponding raw unfiltered electric field observed, for example between the stationary receiver assembly electrodes 348, 350 for the first receiver at a distance of 400 m from the midpoint of transmitter electrodes 336, 338. Signals at subsequent receivers would be delayed in time, phase shifted in frequency, and/or reduced in amplitude according to the properties of the water and seafloor. In particular the time delay in hydrocarbons is less than in other media.

Figure 5A:
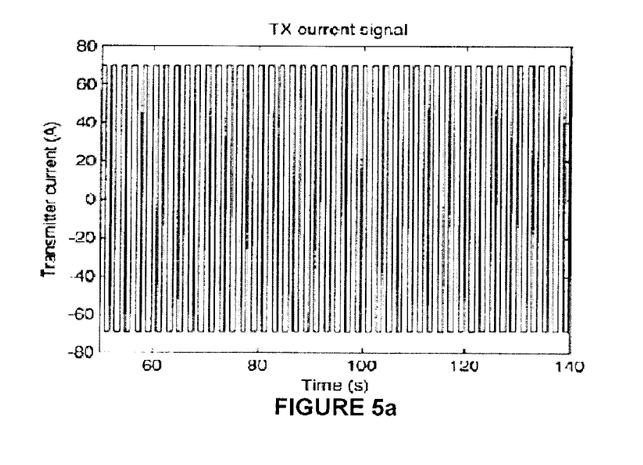
FIGS. 5a and 5b show in graph form raw transmitter current signal and filtered receiver electric field data, respectively, according to one experimental result in accordance with one embodiment.
Figure 5B:
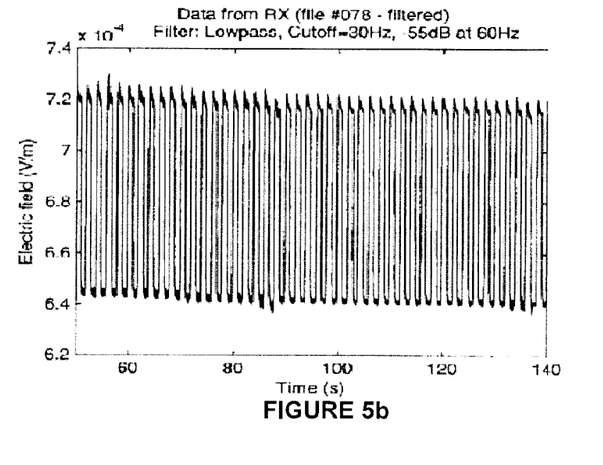

Referring to FIGS. 5a and 5b, FIG. 5a shows in graph form a raw record of the transmitter current signal applied between, for example, the transmitter electrodes 336, 338. FIG. 5b shows in graph form the corresponding filtered electric field observed, for example between the stationary receiver assembly electrodes 348, 350 at a distance of 400 m from the midpoint of transmitter electrodes 336, 338. The digital filter used here is a lowpass filter with a cutoff frequency of 30 Hz and −55 dB of attenuation at 60 Hz.

Figure 6A:
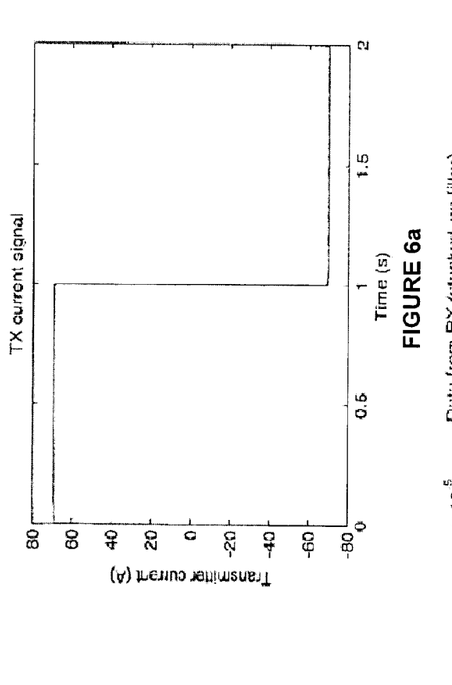
FIGS. 6a, 6b, 6c, and 6d show in graph form stacked transmitter current signal and associated power spectrum and unfiltered, stacked receiver electric field data and associated power spectrum, respectively, according to one experimental result in accordance with one embodiment.
Figure 6B:
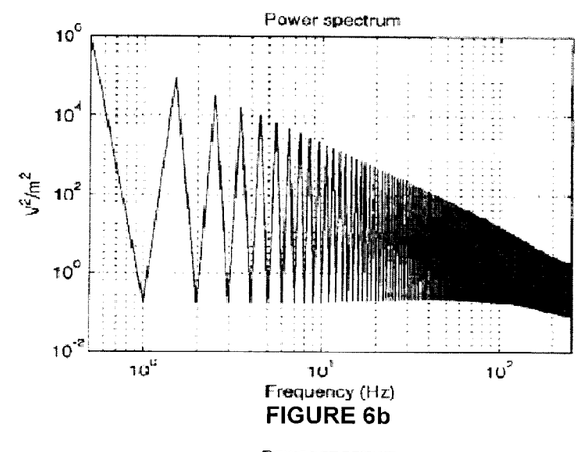
Figure 6C:
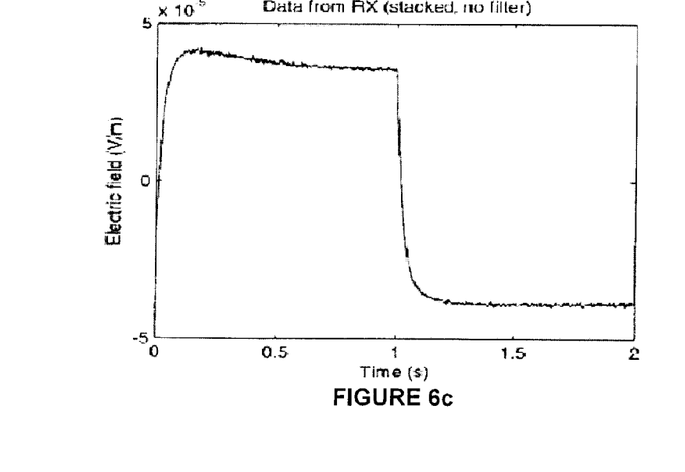
Figure 6D:
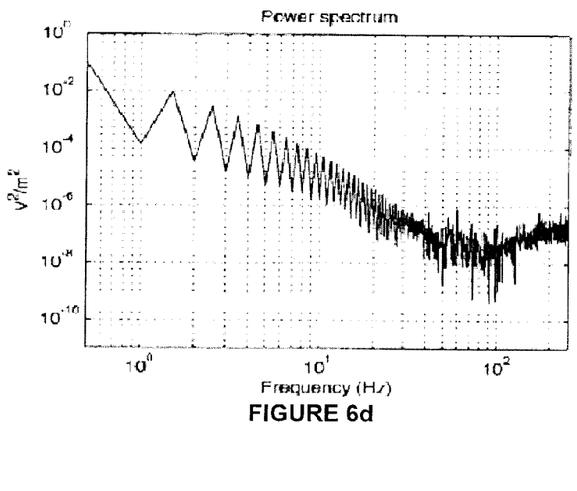

Referring to FIGS. 6a, 6b, 6c, and 6d, FIG. 6a shows in graph form the stacked record (e.g., many cycles averaged together to reduce random noise) of the transmitter current signal applied between, for example, the transmitter electrodes 336, 338, and FIG. 6b shows in graph form the associated power spectrum of the signal applied between the transmitter electrodes. FIG. 6c shows in graph form the corresponding unfiltered and stacked electric field observed, for example between the stationary receiver assembly electrodes 348, 350, and FIG. 6d shows in graph form the associated power spectrum of the electric field observed at the receiver.

Figure 7A:
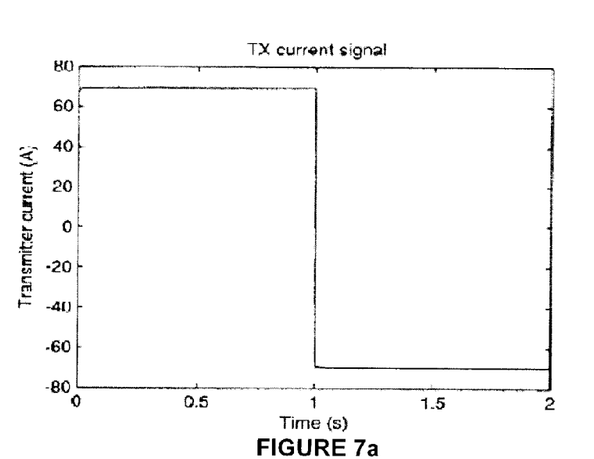
FIGS. 7a, 7b, 7c, and 7d show in graph form stacked transmitter current signal and associated power spectrum and filtered, stacked receiver electric field data and associated power spectrum, respectively, according to one experimental result in accordance with one embodiment.
Figure 7B:
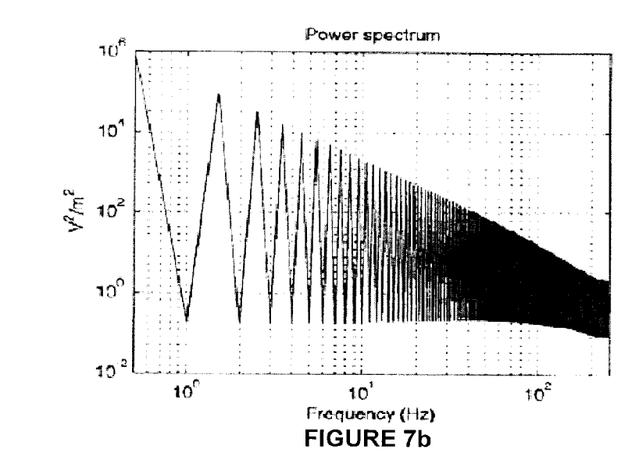
Figure 7C:
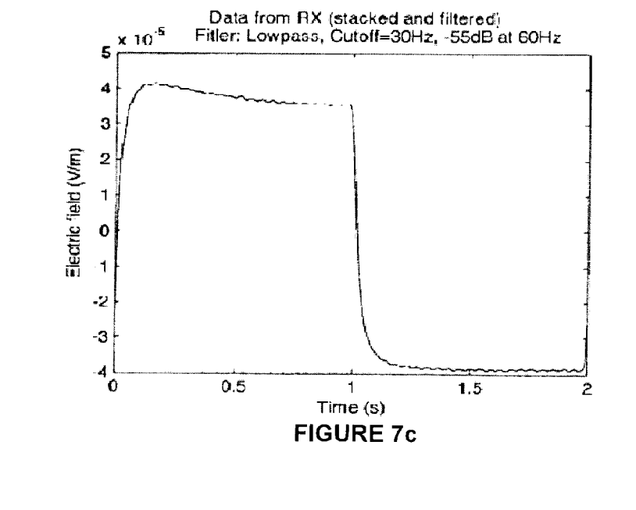
Figure 7D:
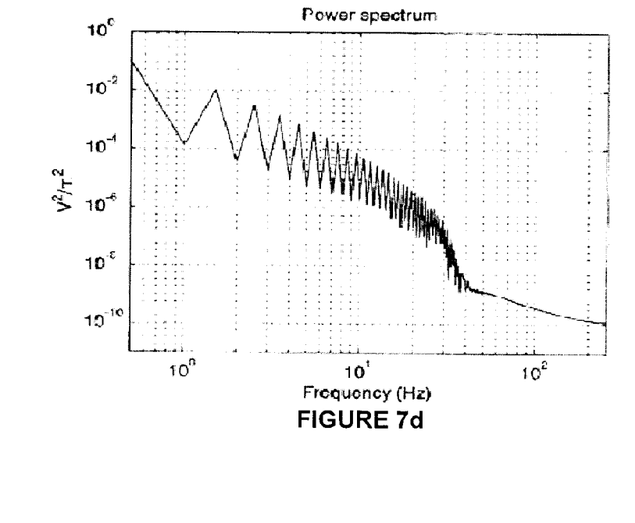

Referring to FIGS. 7a, 7b, 7c, and 7d, FIG. 7a shows in graph form the stacked record of the transmitter current signal applied between, for example, the transmitter electrodes 336, 338, and FIG. 7b shows in graph form the associated power spectrum of the stacked signal applied between the transmitter electrodes. FIG. 7c shows in graph form the corresponding filtered and stacked electric field observed, for example between the stationary receiver assembly electrodes 348, 350, and FIG. 7d shows in graph form the associated power spectrum of the filtered electric field observed at the receiver. The filter used here is a lowpass filter with a cutoff frequency of 30 Hz and −55 dB of attenuation at 60 Hz.

Figure 8A:
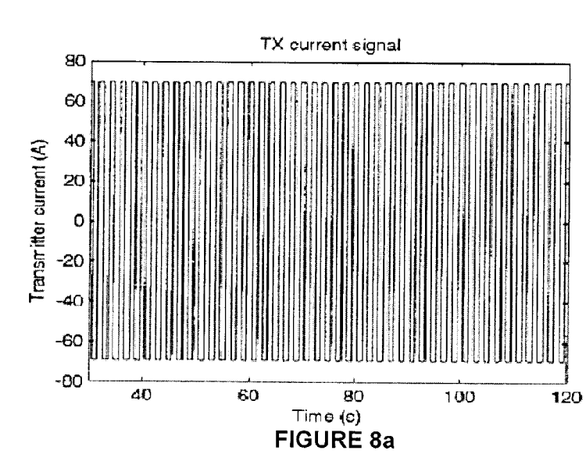
FIGS. 8a and 8b show in graph form raw transmitter current signal and raw receiver electric field data from a moving array, respectively, according to one experimental result in accordance with one embodiment.
Figure 8B:
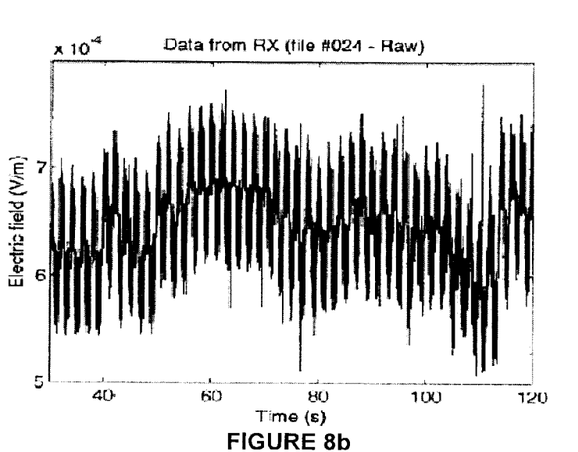

Referring to FIGS. 8a and 8b, FIG. 8a shows in graph form a raw record of the transmitter current signal applied between, for example, the transmitter electrodes 336, 338. FIG. 8b shows in graph form the corresponding unfiltered electric field observed, for example between the receiver assembly electrodes 348, 350 while being towed on the seafloor.

Figure 9A:
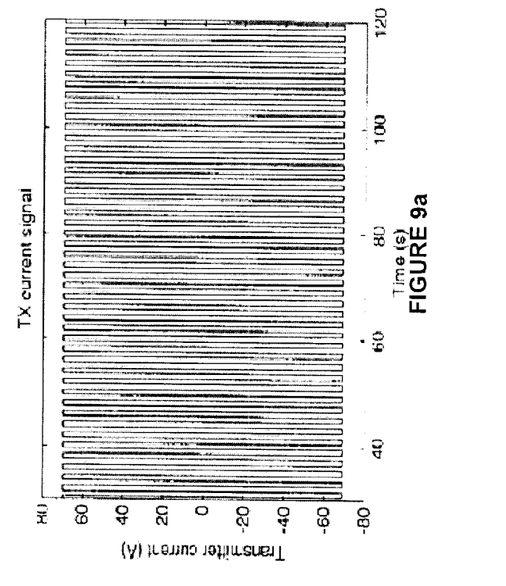
FIGS. 9a and 9b show in graph form raw transmitter current signal and filtered receiver electric field data from a moving array, respectively, according to one experimental result in accordance with one embodiment.
Figure 9B:
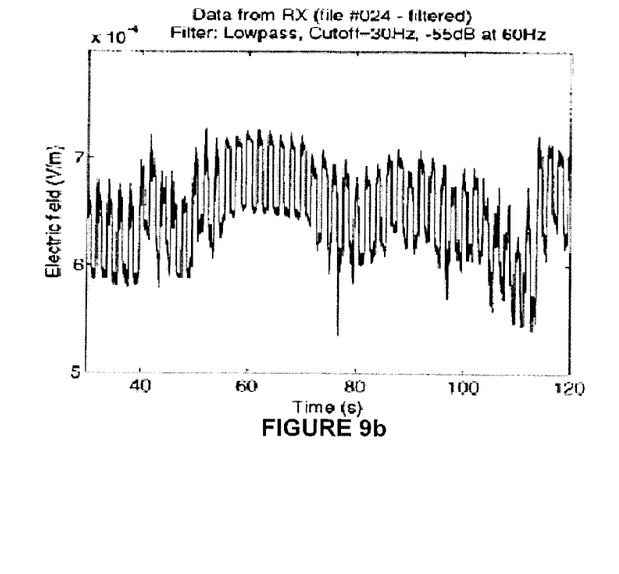

Referring to FIGS. 9a and 9b, FIG. 9a shows in graph form a raw record of the transmitter current signal applied between, for example, the transmitter electrodes 336, 338. FIG. 9b shows in graph form the corresponding filtered electric field observed, for example between the receiver assembly electrodes 348, 350 while being towed on the seafloor. The filter used here is a lowpass filter with a cut-off frequency of 30 Hz and −55 dB of attenuation at 60 Hz.

Figure 10A:
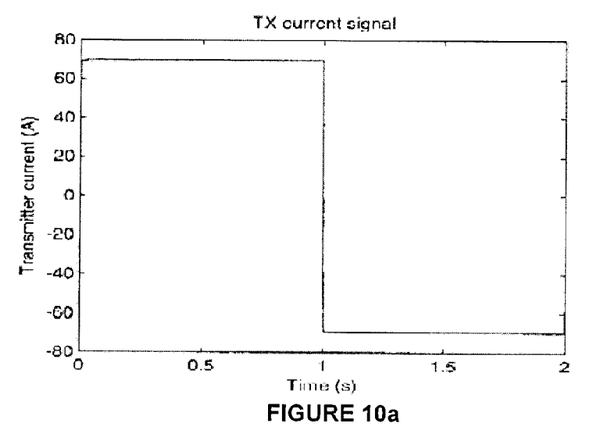
FIGS. 10a, 10b, 10c, and 10d show in graph form stacked transmitter current signal and associated power spectrum and unfiltered, stacked receiver electric field data from a moving array and associated power spectrum, respectively, according to one experimental result in accordance with one embodiment.
Figure 10B:
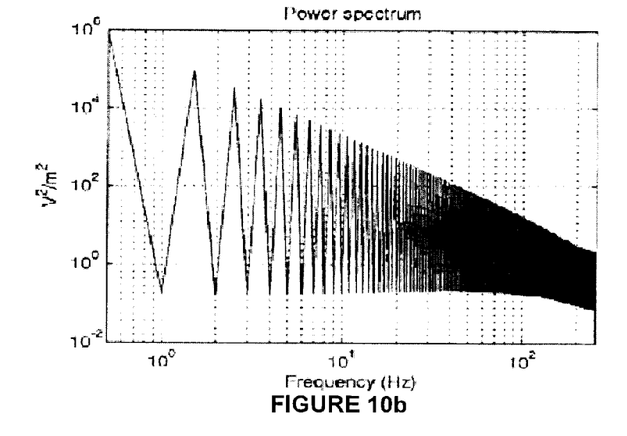
Figure 10C:
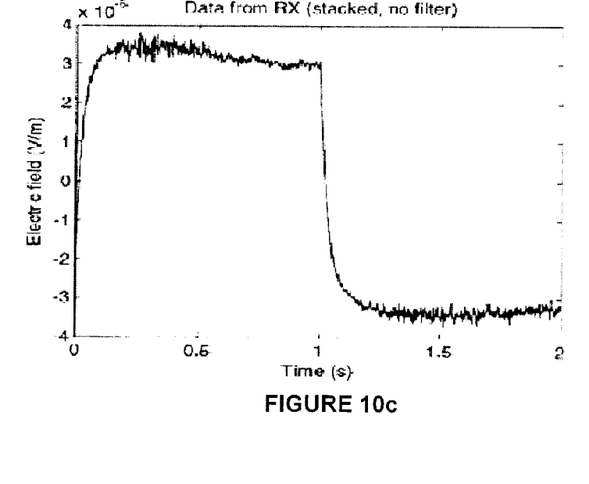
Figure 10D:
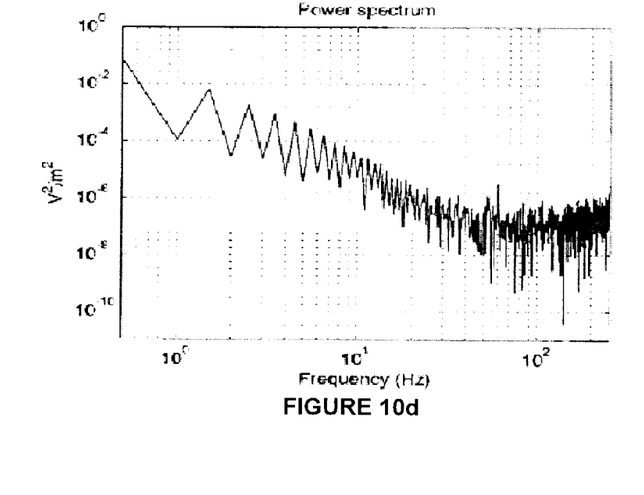

Referring to FIGS. 10a, 10b, 10c, and 10d, FIG. 10a shows in graph form a stacked record of transmitter current signal applied between, for example, the transmitter electrodes 336, 338, and FIG. 10b shows in graph form an associated power spectrum of the stacked signal applied between the transmitter electrodes. FIG. 10c shows in graph form the corresponding unfiltered and stacked electric field observed, for example between the receiver assembly electrodes 348, 350 while being towed, and FIG. 10d shows in graph form the associated power spectrum of the unfiltered, stacked electric field observed at the moving receiver.

Figure 11A:
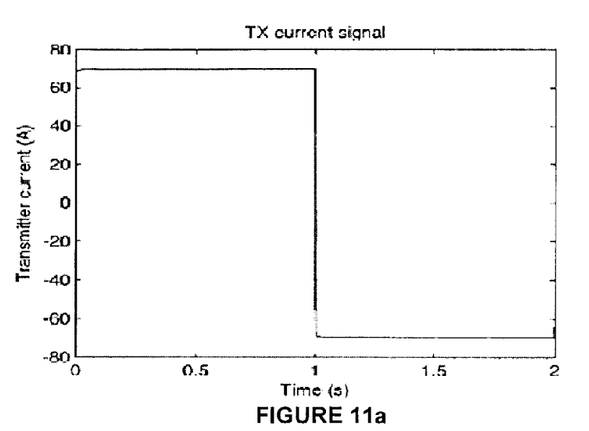
FIGS. 11a, 11b, 11c, and 11d show in graph form stacked transmitter current signal and associated power spectrum and filtered, stacked receiver electric field data from a moving array and associated power spectrum, respectively, according to one experimental result in accordance with one embodiment.
Figure 11B:
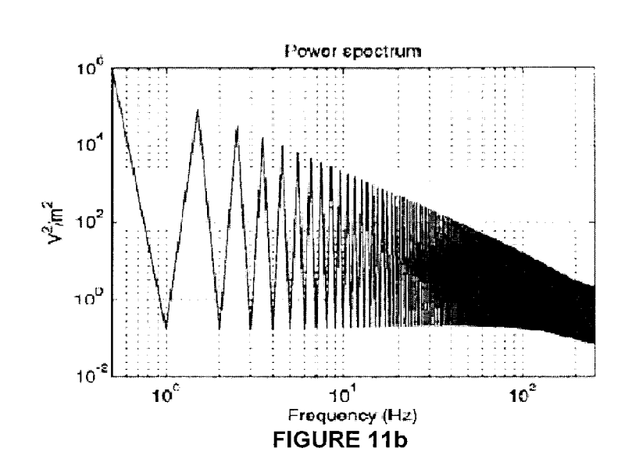
Figure 11C:
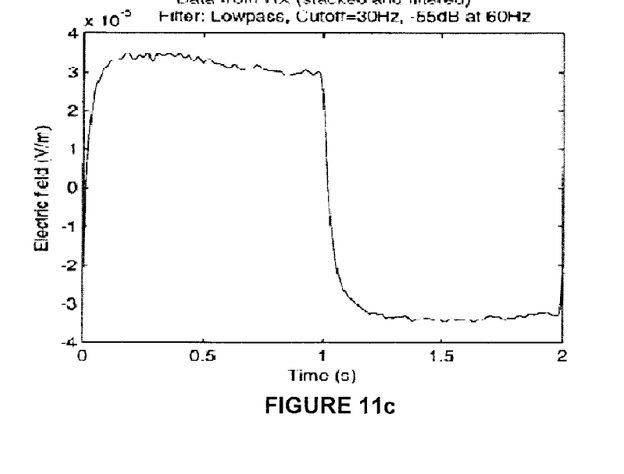
Figure 11D:
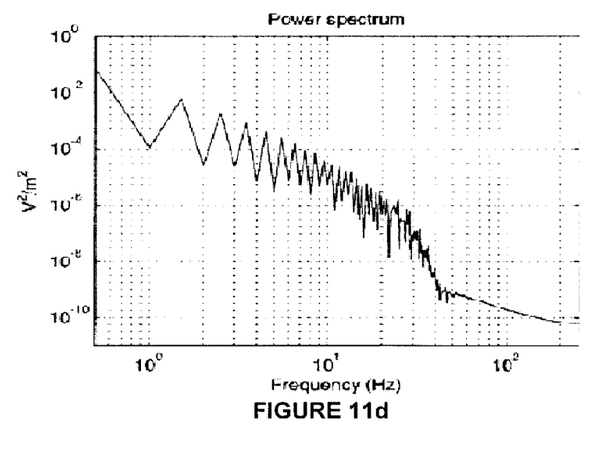

Referring to FIGS. 11a, 11b, 11c, and 11d, FIG. 11a shows in graph form a record of the stacked transmitter current signal applied between, for example, the transmitter electrodes 336, 338, and FIG. 11b shows in graph form an associated power spectrum of the stacked signal applied between the transmitter electrodes. FIG. 11c shows in graph form the corresponding filtered and stacked electric field observed, for example between the receiver assembly electrodes 348, 350 while being towed, and FIG. 11d shows in graph form the associated power spectrum of the filtered, stacked electric field observed at the moving receiver. The filter used here is a lowpass filter with a cut-off frequency of 30 Hz and −55 dB of attenuation at 60 Hz.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A towed system for underwater electromagnetic prospecting for use with a seaward vessel, the towed system comprising:
   a first portion located on the vessel, the first portion including a controller, a common system clock and a power supply system, the common system clock being configured to maintain and periodically transmit a master clock signal following deployment;
   a second towed portion for submersion in the water, the second towed portion for transmitting an electromagnetic signal and receiving a corresponding electromagnetic signal, wherein the second towed portion further comprises:
   a towed instrument container connected to a tow cable, the towed instrument container for transmitting the electromagnetic signal; and
   a plurality of receiver assemblies, connected to the towed instrument container with a main cable, the plurality of receiver assemblies for receiving the corresponding electromagnetic signal, and the plurality of receiver assemblies is arranged in a logarithmically spaced array oriented substantially parallel to a surface upon which the towed system is being towed or is in close proximity to, each receiver assembly including at least (i) a precision clock synchronized periodically with the master clock following deployment, and (ii) digital circuitry configured for stacking a plurality of received electromagnetic signals such that random noise can be reduced during processing of the plurality of received electromagnetic signals; and
   the tow cable connecting the first portion with the second portion, the tow cable including at least one pair of suitable conductors for delivering to the second portion power generated by the first portion and at least one optical fiber for carrying data communications between the first portion and the second portion;

wherein each receiver assembly of the plurality of receiver assemblies is configured as a module separate from the other receiver assemblies and is removably coupled with another receiver assembly of the plurality of receiver assemblies.

2. The towed system according to claim 1, wherein the plurality of receiver assemblies samples and digitizes received electromagnetic signals and communicates with the first portion digitally using the at least one optical fiber.

3. The towed system according to claim 1, wherein a first of the plurality of receiver assemblies is connected to the instrument container with the main cable, and successive receiver assemblies are each connected to an earlier respective receiver assembly in a cascading fashion, each of the plurality of receiver assemblies for receiving the corresponding electromagnetic signal, sampling and digitizing the received electromagnetic signal, and digitally transmitting the received signal to the towed instrument container via the main cable.

4. The towed system according to claim 1, wherein the main cable includes at least one optical fiber for communication and at least a pair of suitable conductors for powering the receivers, and the plurality of receiver assemblies communicate with the instrument container via at least one of the optical fibers and the instrument container communicates with the controller via the optical fiber located in the tow cable.

5. The towed system according to claim 1, wherein the instrument container further comprises:
   a multiplexer/demultiplexer coupled to the tow cable;
   a transmitter driver coupled to the multiplexer/demultiplexer;
   a transmitter coupled to the transmitter driver; and
   two or more electrodes coupled to the transmitter, the electrodes for transmitting the electromagnetic signal through water in contact with the electrodes.

6. The towed system according to claim 5, wherein the electromagnetic disturbance is generated by a power signal applied to the two or more electrodes, the power signal generated by the transmitter using the power delivered by the power supply system over the conductor pair contained in the tow cable and the power signal modulated according to instructions delivered to the transmitter driver by the controller over the at least one optical fiber contained in the tow cable.

7. The towed system according to claim 5, wherein the instrument container further comprises:
   a receiver driver coupled to the multiplexer/demulitplexer; and
   a plug and socket coupled to the receiver driver for connecting to the main cable leading to the plurality of receiver assemblies.

8. The towed system according to claim 7, wherein each receiver assembly of the plurality of receiver assemblies comprises:
   a plug and socket coupled to the main cable leading to one of the instrument container and an earlier receiver assembly;
   a receiver coupled to the plug and socket;
   a further plug and socket coupled to the receiver for connecting to a further main cable for any additional receiver assemblies cascaded behind; and
   two or more electrodes coupled to the receiver assembly for receiving the electromagnetic signal transmitted by a transmitter.

9. The towed system according to claim 1, wherein the first portion further includes:
   a transformer coupled to the power supply system;
   a breaker coupled to the transformer; and
   a winch assembly coupled to the breaker, the winch assembly for dispensing and retrieving the tow cable into the water from the seaward vessel.

10. The towed system according to claim 9, wherein the winch assembly comprises:
    slip rings; and
    a wire to optical fiber converter for converting electrical signals generated by the controller and destined to the controller into optical signals for transmission along the at least one optical fiber contained in the tow cable.

11. The towed system according to claim 1, wherein an instrument within the towed instrument container is contained in a pressure-safe case.

12. The towed system according to claim 1, wherein each receiver assembly of the plurality of receiver assemblies is contained in a pressure-safe case.

13. The towed system according to claim 5, wherein the transmitter and transmitter driver form a linear class-D amplifier capable of generating the electromagnetic signal for transmission having a defined waveform.

14. The towed system according to claim 13, wherein data about the defined waveform to be generated and transmitted is provided to the transmitter by the controller.

15. The towed system according to claim 13, wherein the defined waveform is any arbitrary waveform.

16. The towed system according to claim 13, wherein the defined waveform is selected from the group consisting of a sinusoid, a square wave, and a digital pseudo random binary sequence (PRBS).

17. The towed system according to claim 1 wherein the plurality of receiver assemblies is mechanically cascaded and assembled in one or more sections, with each of the one or more sections having a different length.

18. A towed system for electromagnetic prospecting for use with a towing vessel, the towed system comprising:
    a first portion located on the vessel, the first portion including a controller, a common system clock and a power supply system, the common system clock being configured to maintain and periodically transmit a master clock signal following deployment;
    a second towed portion for towing across land, the second towed portion for transmitting an electromagnetic signal and receiving a corresponding electromagnetic signal, wherein the second towed portion further comprises:
    a towed instrument container connected to a tow cable, the towed instrument container for transmitting the electromagnetic signal; and
    a plurality of receiver assemblies connected to the towed instrument container with a main cable, the plurality of receiver assemblies for receiving the corresponding electromagnetic signal, and the plurality of receiver assemblies is arranged in a logarithmically spaced array oriented substantially parallel to a surface upon which the towed system is being towed or is in close proximity to, each receiver assembly including at least (i) a precision clock synchronized periodically with the master clock following deployment, and (ii) digital circuitry configured for stacking a plurality of received electromagnetic signals such that random noise can be reduced during processing of the plurality of received electromagnetic signals; and
    the tow cable connecting the first portion with the second portion, the tow cable including at least one pair of suitable conductors for delivering to the second portion power generated by the first portion and at least one optical fiber for carrying data communications between the first portion and the second portion;

wherein each receiver assembly of the plurality of receiver assemblies is configured as a module separate from the other receiver assemblies and is removably coupled with another receiver assembly of the plurality of receiver assemblies.

19. The towed system according to claim 18, wherein a receiver assembly samples and digitizes received electromagnetic signals and communicates with the first portion digitally using the at least one optical fiber.

20. The towed system according to claim 18, wherein the electromagnetic signal transmitted by the towed instrument container and the corresponding electromagnetic signal received by the plurality of receiver assemblies are sampled simultaneously.

21. The towed system according to claim 18 wherein the plurality of receiver assemblies is mechanically cascaded and assembled in one or more sections, with each of the one or more sections having a different length.

22. A towed system for underwater electromagnetic prospecting for use with a seaward vessel, the towed system comprising:

a first portion located on the vessel, the first portion including a controller, a common system clock and a power supply system, the common system clock being configured to maintain and periodically transmit a master clock signal following deployment;

a second towed portion for submersion in the water, the second towed portion for transmitting an electromagnetic signal and receiving a corresponding electromagnetic signal, wherein the second towed portion further comprises:

a towed instrument container connected to a tow cable, the towed instrument container for transmitting the electromagnetic signal; and a plurality of receiver assemblies connected to the towed instrument container with a main cable, the plurality of receiver assemblies for receiving the corresponding electromagnetic signal, and the plurality of receiver assemblies is arranged in a logarithmically spaced array oriented substantially parallel to a surface upon which the towed system is being towed or is in close proximity to, each receiver assembly including at least (i) a precision clock synchronized periodically with the master clock following deployment, and (ii) digital circuitry configured for stacking a plurality of received electromagnetic signals such that random noise can be reduced during processing of the plurality of received electromagnetic signals; and the tow cable connecting the first portion with the second portion, the tow cable including at least one pair of suitable conductors for delivering to the second portion power generated by the first portion and at least one optical fiber for carrying data communications between the first portion and the second portion;

wherein the electromagnetic signal transmitted by the towed instrument container and the corresponding electromagnetic signal received by the plurality of receiver assemblies are sampled simultaneously; and wherein each receiver assembly of the plurality of receiver assemblies is configured as a module separate from the other receiver assemblies and is removably coupled with another receiver assembly of the plurality of receiver assemblies.

\* \* \* \* \*